United States Patent
Norem et al.

(10) Patent No.: US 10,769,280 B2
(45) Date of Patent: Sep. 8, 2020

(54) SIDE CHANNEL ATTACK COUNTERMEASURES FOR SECURE BOOTLOADING

(71) Applicant: Silicon Laboratories Inc., Austin, TX (US)

(72) Inventors: Joshua Jay Norem, Austin, TX (US); Daniel Riedler, Los Angeles, CA (US); Chad Steven O'Neill, Abbotsford (AU)

(73) Assignee: Silicon Laboratories, Inc., Austin, TX (US)

( * ) Notice: Subject to any disclaimer, the term of this patent is extended or adjusted under 35 U.S.C. 154(b) by 137 days.

(21) Appl. No.: 16/218,727

(22) Filed: Dec. 13, 2018

(65) Prior Publication Data

US 2020/0193028 A1 Jun. 18, 2020

(51) Int. Cl.
*G06F 21/57* (2013.01)
*H04L 9/32* (2006.01)
*H04L 9/00* (2006.01)
*G06F 21/51* (2013.01)

(52) U.S. Cl.
CPC ............ *G06F 21/575* (2013.01); *G06F 21/51* (2013.01); *G06F 21/572* (2013.01); *H04L 9/004* (2013.01); *H04L 9/3247* (2013.01)

(58) Field of Classification Search
CPC ...... G06F 21/575; G06F 21/51; G06F 21/572; H04L 9/3247; H04L 9/004
See application file for complete search history.

(56) References Cited

U.S. PATENT DOCUMENTS

| 9,165,143 | B1* | 10/2015 | Sanders | G06F 21/575 |
| 9,230,112 | B1* | 1/2016 | Peterson | G06F 21/575 |
| 2011/0208975 | A1* | 8/2011 | Sibert | G06F 8/65 |
| | | | | 713/189 |
| 2012/0110333 | A1* | 5/2012 | Lukkarila | G06F 21/51 |
| | | | | 713/176 |
| 2019/0007216 | A1* | 1/2019 | Meriac | H04L 9/30 |

* cited by examiner

*Primary Examiner* — Cheng-Feng Huang
(74) *Attorney, Agent, or Firm* — Nields, Lemack & Frame, LLC (57) ABSTRACT

A system and method for minimizing the likelihood that the secret key used by a bootloader is compromised is disclosed. A bootloader is installed on the device. The bootloader is a software program that performs many functions. These functions may include checking the checksum of the incoming software image for integrity, decrypting the incoming software image using a secret key, deleting data in the FLASH memory, installing the new software image in the FLASH memory and other functions. The bootloader utilizes various techniques to track the versions of the software image being installed. The method counts the number of incomplete attempts that are made when trying to update the software image. By monitoring these parameters, the bootloader can determine when a malicious actor is attempting a side channel attack. In response, the bootloader may not allow a new software image to be loaded or the secret key to be accessed.

17 Claims, 6 Drawing Sheets

| VERSION NUMBER | NUMBER OF INSTALLATIONS |
|---|---|
| A.1 | 4 |
| B.1 | 1 |
| B.2 | 25 |
| C.3 | 2 |

FIG. 6

SIDE CHANNEL ATTACK COUNTERMEASURES FOR SECURE BOOTLOADING

FIELD

This disclosure describes systems and methods for detecting and protecting against a side channel attack during code updates.

BACKGROUND

Encryption is now used for a plurality of applications, such as password protection for wireless networks, smart cards, and others. Various algorithms are used to provide this encryption. Most involve the use of a secret key, which may be 128 bits or more. Messages, which may be referred to as plaintext, are encoded by the source using the secret key, and transmitted to a destination. The destination then uses the same secret key to decrypt the message sent by the source.

Since the secret key has 128 bits, the possibility of breaking the secret key using a brute force attack is small. Many applications utilize this type of encryption. For example, many devices have software or firmware that can be updated. Traditionally, the new software image may be encrypted using the secret key, which insures that only authorized software images are loaded onto the device.

However, recently, side-channel attacks have become more prevalent. A side-channel is a characteristic of the system that unintentionally provides information concerning the secret key. One example of a side-channel is power consumption.

Encryption and decryption algorithms involve various software and/or hardware procedures. Each of these software and/or hardware procedures may typically use a different amount of power. Thus, by monitoring the power consumption of a cryptographic system, it may be possible to deduce the progression of the encryption and decryption algorithms.

In fact, by only monitoring the power consumption of a cryptographic system, it has been demonstrated that it is possible to decipher secret keys from a wide variety of different cryptographic algorithms, such as Advanced Encryption Standard (AES). Techniques used to decipher these secret keys may include simple power analysis (SPA), differential power analysis (DPA), and high order differential power analysis (HO-DPA).

If the secret key that is used to encrypt the software image is compromised, a malicious user may install an unwanted software image on the device or gain access to confidential information.

Therefore, it would be beneficial if there were a system and method that could reduce the possibility that the secret key used by a bootloader is compromised via a side channel attack.

SUMMARY

A system and method for minimizing the likelihood that the secret key used by a bootloader is compromised is disclosed. A bootloader is installed on the device. The bootloader is a software program that performs many functions. These functions may include checking the checksum of the incoming software image for integrity, decrypting the incoming software image using a secret key, deleting data in the FLASH memory, installing the new software image in the FLASH memory and other functions. The bootloader utilizes various techniques to track the versions of the software image being installed. The method also counts the number of incomplete attempts that are made when trying to update the software image. By monitoring these parameters, the bootloader can determine when a malicious actor is attempting a side channel attack. In response, the bootloader may not allow a new software image to be loaded or the secret key to be accessed.

In one embodiment, a method of securely loading a new software image onto a device is disclosed. The method comprises receiving, at the device, a bundle, the bundle containing a header and an encrypted payload, from a sender; verifying the integrity of the header and the identity of the sender, wherein the header includes a version number; performing a version check; comparing a value of an attempts counter to install a new software image to a predetermined threshold, wherein the attempts counter tracks a number of times that an installation of a software image has been attempted; decrypting the encrypted payload, wherein the new software image is contained in the encrypted payload, only if: the version check is successful and the attempts counter is less than the predetermined threshold; and after the decrypting, installing the new software image in a memory device in the device. In certain embodiments, the version check comprises determining that the version number in the header is greater than a version of the software image currently installed in the device. In certain embodiments, the method further comprises receiving an update graph from the sender, wherein the update graph specifies the allowed versions as a function of a version of the software image currently installed in the device, wherein the version check determines whether the version in the header is an allowed version based on the update graph. In certain embodiments, the attempts counter is incremented prior to the decrypting. In some further embodiments, the attempts counter is reset after the software image has been successfully installed in the memory device. In certain embodiment, the method also comprises detecting that an error condition has occurred if the attempts counter is not less than the predetermined threshold. In some embodiments, the device will not decrypt any encrypted payloads once the error condition is detected. In certain embodiments, the bundle is signed by the sender and the method further comprises verifying the integrity of the bundle and the identity of the sender prior to the decrypting.

According to another embodiment, a software program disposed in a non-transitory storage medium is disclosed. The software program comprises instructions, which when executed by a processing unit of a device, enable the device to: receive a bundle, the bundle containing a header and an encrypted payload, from a sender; verify the integrity of the header and the identity of the sender, wherein the header includes a version number; perform a version check; compare a value of an attempts counter to install a new software image to a predetermined threshold, wherein the attempts counter tracks a number of times that an installation of a software image has been attempted; decrypt the encrypted payload, wherein the new software image is contained in the encrypted payload, only if: the version check is successful and the attempts counter is less than the predetermined threshold; and after the decrypting, install the new software image in a memory device in the device. In certain embodiments, the software program further comprising instructions, which when executed by the processing unit, enable the device to: receive an update graph from the sender, wherein the update graph specifies the allowed versions as a function of a version of the software image currently installed in the device, wherein the version check determines whether the version in the header is an allowed version based on the update graph. In certain embodiments, the bundle is signed by the sender and the software program further comprises instructions that enable the device to verify the integrity of the bundle and the identity of the sender prior to the decrypting.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
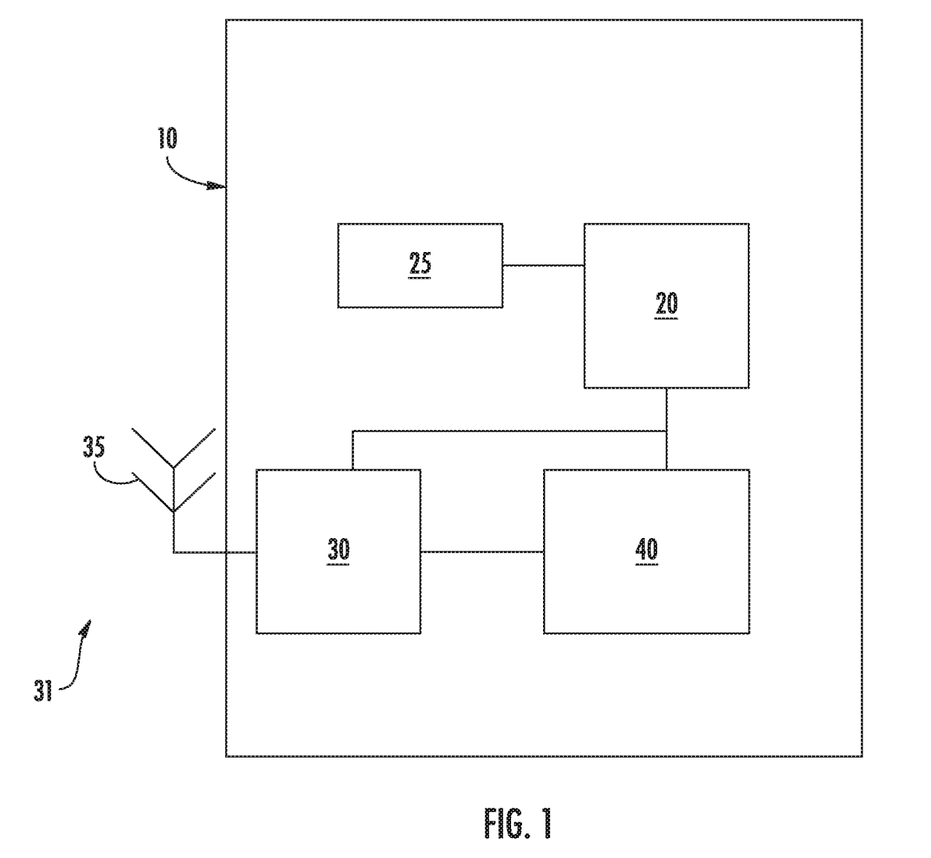
FIG. 1 is a block diagram of a representative system according to one embodiment.

FIG. 1 shows a block diagram of a representative device 10. This device may serve as a network device, or perform any other function, as described in more detail below.

As shown in FIG. 1, the device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The device 10 also includes a network interface 30, which may be a wireless interface including an antenna 35. The network interface 30 may support any wireless network, such as Wi-Fi, networks utilizing the IEEE 802.15.4 specification, such as Zigbee, networks utilizing the IEEE 802.15.6 specification, and wireless smart home protocols, such as Z-Wave. Alternatively, the network interface 30 may support a wired network, such as Ethernet. Further, the network interface 30 may support a different communication interface, such as SPI, UART, USB or others. The network interface 30 is used to allow the network device to communicate with other devices disposed on the network 31.

The device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the device 10. The instructions contained on this second computer readable media may be downloaded onto the memory device 25 to allow execution of the instructions by the device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the device 10, not its physical configuration.

Figure 2:
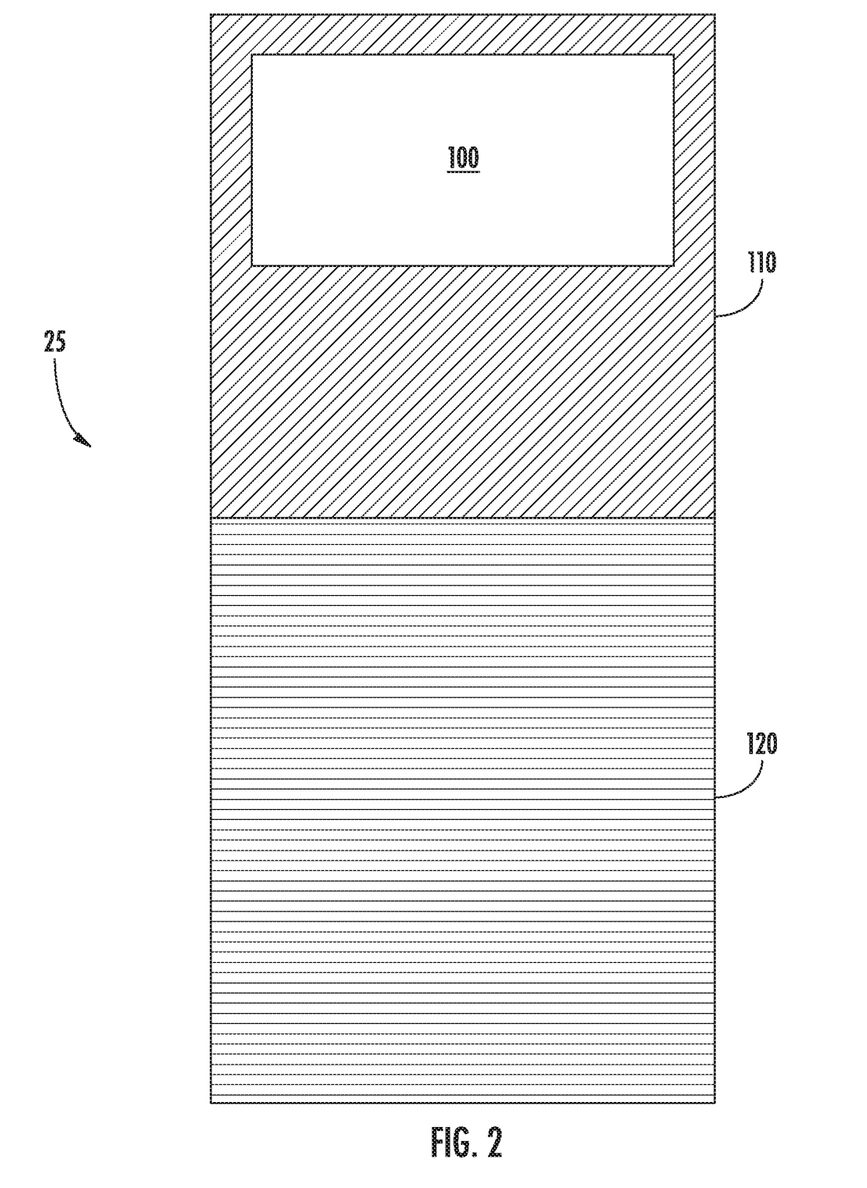
FIG. 2 is a representative drawing of the memory architecture according to one embodiment.

The memory device 25 may be a FLASH memory, or may be a plurality of different memory elements. One organization of the memory device 25 is shown in FIG. 2. In this embodiment, the bootloader 100 is loaded into a first portion 110 of the memory device 25. As stated above, the bootloader 100 is a software program that is executed by the processing unit 20. In other words, the bootloader 100 is a software program disposed in a non-transitory storage medium. By executing the bootloader 100, the processing unit 20 is able to verify the identity of the sender, check the checksum of the incoming software image for integrity, decrypt the incoming software image using a secret key, delete data in the FLASH memory, install the new software image in the FLASH memory and other functions. The memory device 25 may also include a second portion 120, different from the first portion 110. The second portion 120 can be erased and rewritten without affecting the first portion 110. In other words, a new software image can be written to the second portion 120 without affecting the bootloader 100 stored in the first portion 110. In another embodiment, the bootloader 100 may be disposed in a different memory device, different from the memory device in which the software image is stored.

Figure 3:
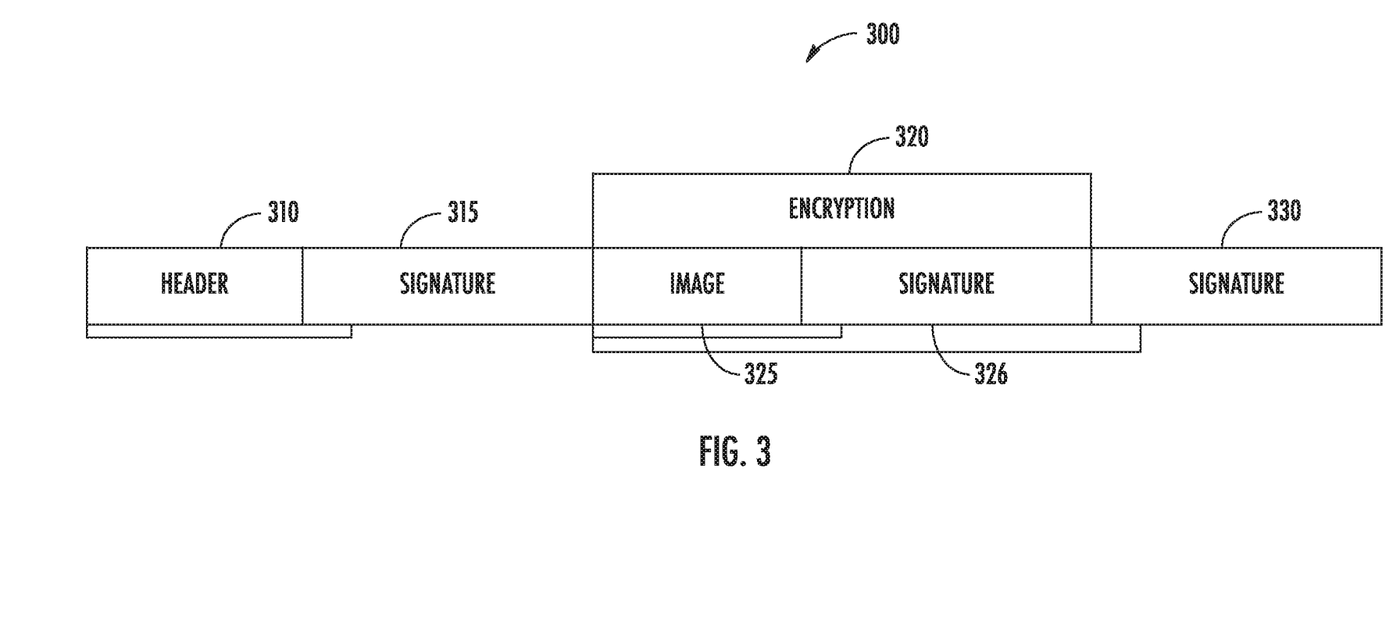
FIG. 3 shows the format of a bundle according to one embodiment.

In operation, a trusted third party, such as the software manufacturer or the device manufacturer, transmits a new software image to the device 10, such as via the network interface 30. This new software image may be part of a bundle 300. A representative format for a bundle is shown in FIG. 3. In certain embodiments, one or more signatures is provided in the bundle 300. A signature is a hash of certain data, which is then signed using a private key. The bootloader 100 has the associated public key associated with this private key. For example, the public key may be loaded into the device 10 at the time of manufacture. Alternatively, the public key may be transmitted to the device 10.

The bundle 300 may include a header 310. This header 310 may specify the version number of the new software image and other information. This information may include which modules of the software are being updated in this image, and may also include information regarding allowed versions. The header 310 is not encrypted. However, the header 310 is signed by the trusted third party with header signature 315, using the private key. The header signature 315 only applies to the header 310.

The bundle also includes an encrypted payload 320. In certain embodiments, the encrypted payload 320 includes the new software image 325, which is signed by the trusted third party with image signature 326. Like header signature 315, this image signature 326 is signed using the private key. However, both the new software image 325 and the image signature 326 are encrypted. This encryption may be performed using a symmetric key. The bootloader 100 has already received the symmetric key at an earlier time from the trusted third party. In some embodiments, both the symmetric key and the public key are loaded into the device 10 during manufacturing, such as when the device is tested. Alternatively, the encryption may be performed using a public key, wherein the bootloader 100 has been provided with the private key at an earlier time.

In other embodiments, the image signature 326 is not included. In certain embodiments, a payload signature 330 is appended to the bundle 300. This payload signature 330 is not encrypted and is the signature for the encrypted payload. Again, this payload signature 330 is generated by the trusted third party using the private key.

Of course, the format of the bundle may differ from that shown in FIG. 3. For example, the header signature 315 may not be employed. In this case, the payload signature 330 includes the header 310 and the encrypted payload 320. Alternatively, as suggested above, the image signature 326 may be omitted. In this embodiment, the bootloader 100 relies on the payload signature 330 to validate the software image 325. A number of other variants are also possible.

Figure 4:
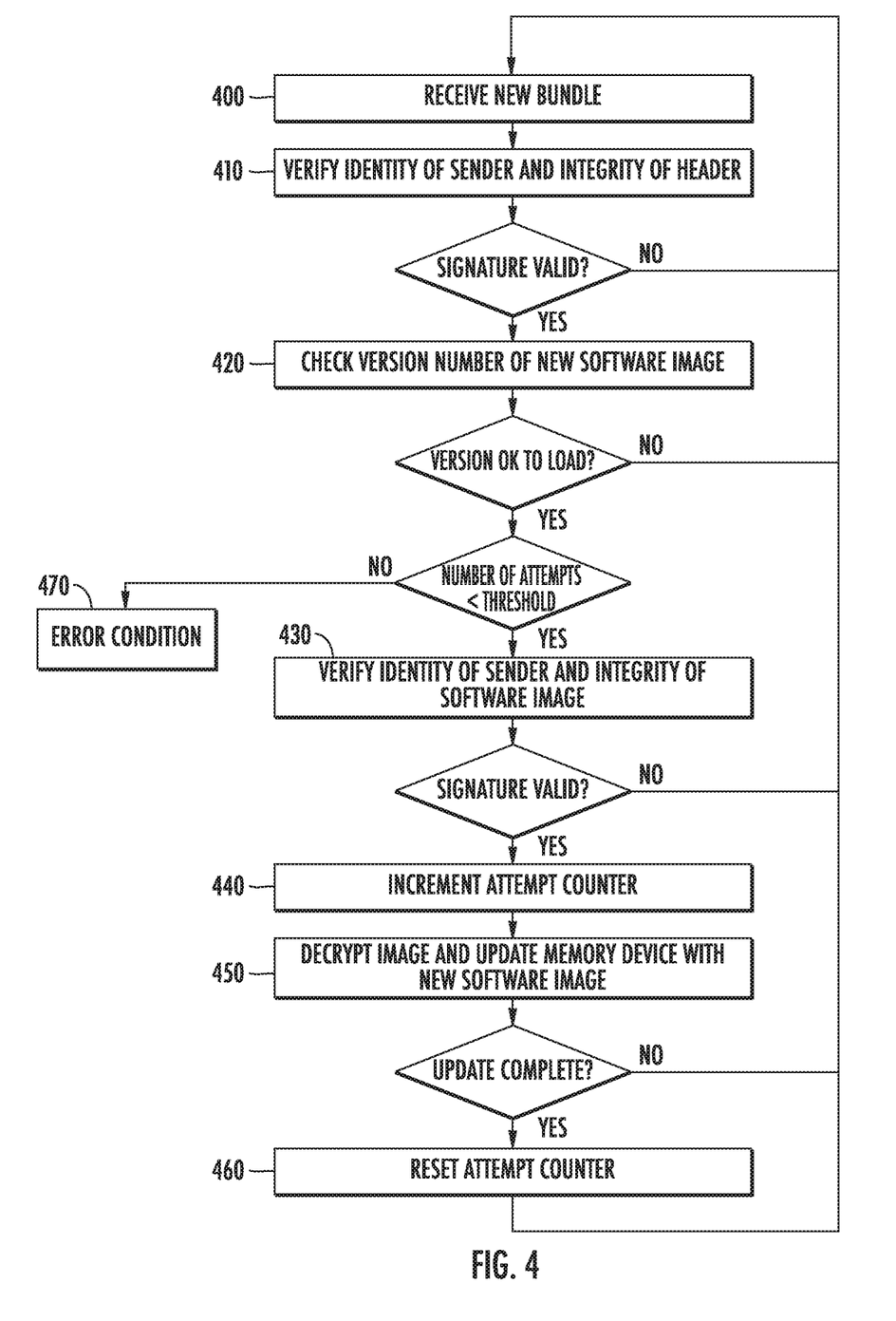
FIG. 4 is a flowchart showing the operation of the bootloader according to one embodiment.

FIG. 4 shows a flowchart of the operation of the bootloader 100. As stated above, the trusted third party transmits a new bundle to the bootloader 100, such as via the network interface 30. The bootloader 100 receives the new bundle, as shown in Box 400. The bootloader 100 first validates that the bundle was transmitted by the trusted third party and that the header 310 is not corrupted, as shown in Box 410. This may be achieved by using the public key to verify the hash and the identity of the trusted third party based on the header signature 315. If the header signature 315 is not valid, the bootloader 100 terminates operation and waits for the next new bundle. Once the bootloader 100 has verified the identity of the trusted third party and the integrity of the header 310, the bootloader 100 then parses the header 310. Within the header 310 is the version number of the new software image. The bootloader 100 checks that this version is an acceptable version to use, as shown in Box 420. This performance of this function is explained in more detail below.

If the version is unacceptable, the bootloader 100 terminates operation and waits for the next new bundle. If the version is acceptable, the bootloader 100 then checks if the number of attempts exceeds a predetermined threshold. If it does, the bootloader 100 may indicate an error condition as shown in Box 470. In other words, the bootloader 100 only allows a certain number of unsuccessful attempts before declaring an error condition. This is described in more detail below.

If the number of attempts is less than the predetermined threshold, the bootloader 100 verifies the authenticity of the encrypted payload 320 using the payload signature 330, as shown in Box 430. If the payload signature is not valid, the bootloader 100 terminates operation and waits for the next new bundle. It is also possible to perform the checks for number of attempts and the payload signature 330 is the opposite order if desired. If the version number is acceptable, the number of attempts is less than a predetermined threshold and the payload signature 330 is valid, the bootloader increments the attempt counter, as shown in Box 440. The function of the attempt counter is described in more detail below. Subsequently, the bootloader 100 decrypts the encrypted payload 320, as shown in Box 450. This is done using a symmetric key or a private key, as described above. Once the decryption is complete, the bootloader 100 uses the image signature 326 (if present) to verify the integrity of the software image and the identity of the sender.

The bootloader 100 then begins the process of updating the software image, as shown in Box 450. This may include erasing the second portion 120 of the memory device 25. The bootloader 100 may also store the entire software image in a volatile memory so that the software image can be copied from a volatile memory to the second portion 120.

In certain embodiments, the attempt counter is reset after the update is completely successfully, as shown in Box 460. The bootloader 100 then waits for the next new bundle.

Side channel attacks typically require a large amount of data from which statistical analysis can be performed. For example, a malicious actor may force a large number of software updates in order to collect the data necessary to determine the symmetric key. In this disclosure, a malicious actor is defined as any party trying to obtain the confidential symmetric encryption key. In one embodiment, the malicious actor may monitor the amount of power used by the device 10 or the processing unit 20, and determine the symmetric key from that power consumption data.

There are three checks that may be performed by the bootloader 100 that minimize the likelihood of a successful side channel attempt. Each of these checks serves to limit the number of times that the bootloader 100 attempts to decrypt an encrypted payload 320. The first check is the use of a one or more signatures, such as header signature 315, image signature 326 and payload signature 330 to verify the identity of the sender and the integrity of the transmitted information. The other two checks are the version check and the attempts limit. Each is described in more detail below.

The version check is used to insure that a malicious actor does not simply continuously update the software image on the device using one or more valid bundles. In the simplest embodiment, a malicious actor may intercept a valid bundle being sent from the trusted third party to the device 10. The malicious actor may then attempt to repeatedly update the device using this same valid bundle. In this embodiment, the version check may simply insure that the version of the new software image is different from the current installed version. This version check is sufficient to block this type of attack.

This simple implementation can be defeated by alternating two different valid bundles. For example, the malicious actor may capture Bundle N and Bundle N+1 as they are being sent from the trusted third party to the device 10. The malicious actor may overcome the simple version check described above by updating the device 10 by alternating these two bundles. Thus, in another embodiment, the version check requires that the new version be greater than the previous version. In this way, the malicious actor cannot use two valid bundles, as described above.

Figure 5:
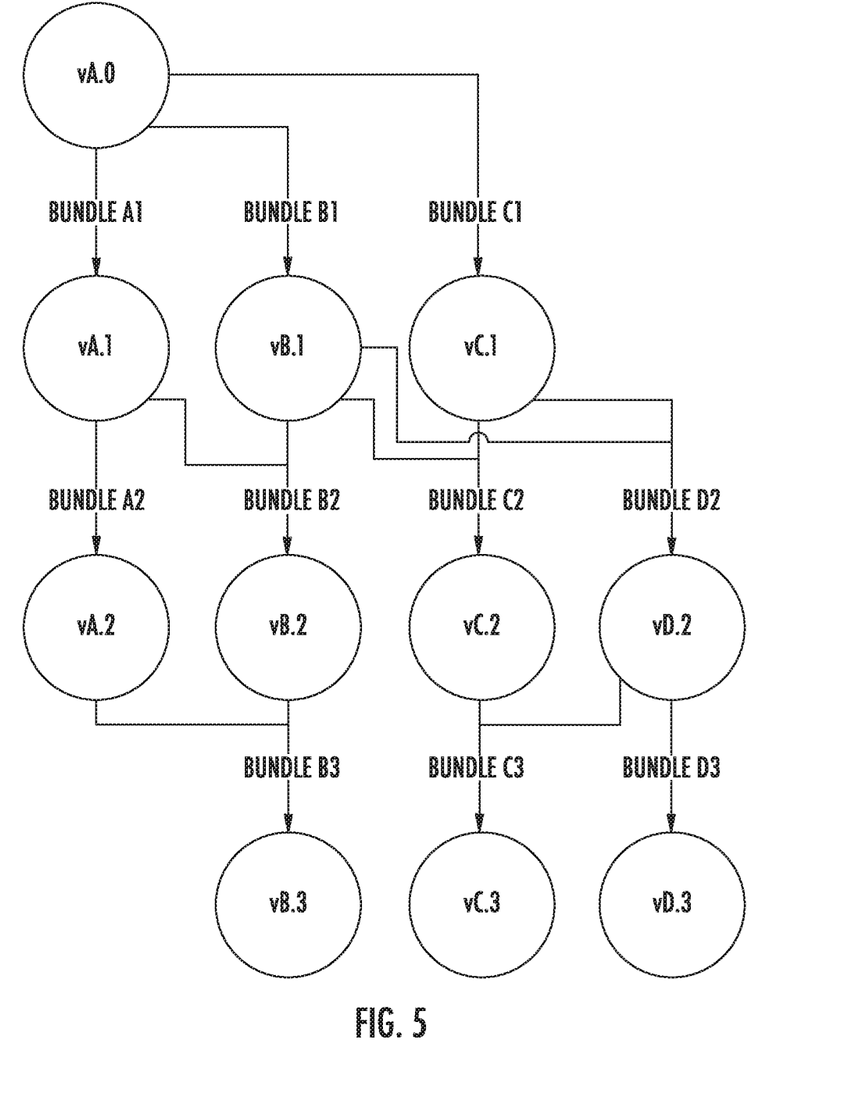
FIG. 5 shows an update graph according to one embodiment.

In another embodiment, the software provider may create an upgrade graph, such as the one shown in FIG. 5. Each circle in FIG. 5 represents a bundle and each line represents the allowable update versions. For example, in FIG. 5:

Bundle A.1 may be installed only if image A.0 is currently installed.

Bundle B.1 may be installed only if image A.0 is currently installed.

Bundle B.2 may be installed if either image A.1 or B.1 is currently installed.

Bundle C.3 may be installed if either image C.2 or D.2 is currently installed.

This update graph may be transmitted to the device 10 by the trusted third party. For example, in one embodiment, the update graph may be transmitted as part of the header 310.

In this embodiment, the bootloader 100 determines the new version number and the installed version number. The bootloader 100 then consults the update graph to determine if the new version number can be installed.

Figure 6:
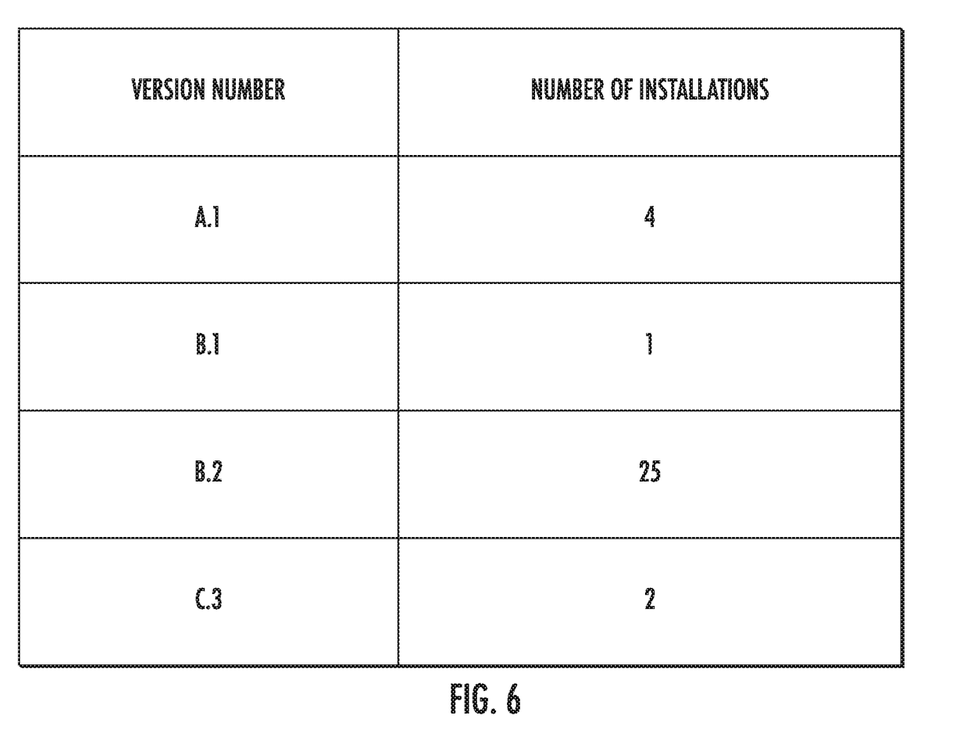
FIG. 6 is a table showing the version number and the number of installations.

In yet another embodiment, the bootloader 100 may retain a list of all previous installed versions. If the bootloader 100 detects that a new bundle has the same version number as one of the previously installed versions, the bootloader 100 may not allow the bundle to be installed. In yet another embodiment, the bootloader 100 may allow each previous installed version to be re-installed a limited number of times. In this embodiment, the bootloader 100 maintains a table of the previous installed versions and the number of times that each of these versions has been installed, as shown in FIG. 6. If the number of installations for a particular version is exceeded, the bootloader 100 may not install the bundle. In yet another embodiment, the bootloader 100 simply counts the number of times a previously installed version is reinstalled, and if the number of installations of all previous versions is exceeded, the bootloader 100 will not install the bundle.

Thus, in summary, the version check is used to prevent a malicious actor from using one or more previously transmitted bundles repeatedly to perform the side channel attack. Note that other version checks may also be used and the disclosure is not limited to these embodiments.

The bootloader 100 may also include an attempts limit. The attempts limit may be employed in a variety of ways.

In one embodiment, the bootloader 100 counts the number of installations that have been attempted. In this embodiment, the reset of the attempts counter, shown in Box 460 of FIG. 4, is not performed. In this way, the bootloader 100 only allows a limited number of updates before it determines that an error condition has occurred.

In another embodiment, the bootloader 100 sets a limit to the number of attempts that can be made for each version of the software image. For example, as shown in FIG. 6, the bootloader 100 may track the previous installed versions and the number of installations that have been made for that version. If the number of installations for a particular version is exceeded, the bootloader 100 may not install that version anymore. For example, in FIG. 6, Version B.2 has been installed 25 times. This large number may be indicative of a side channel attack. Thus, the bootloader 100 may refuse to install version B.2 again. In another embodiment, if the number of installations for any version is exceeded, the bootloader 100 may refuse to install any bundles.

In another embodiment, the bootloader 100 counts the number of attempts to install a new bundle. For example, after the encrypted payload 320 has been decrypted but before the installation is complete, the malicious actor may power off the device 10. In this way, the bundle is not installed and therefore, the version check will not detect an error. Thus, to counteract this type of attack, the bootloader 100 may count attempts to install a new bundle. Attempts may be different than installations, as an installation may be aborted, such as by a power shutdown. In that case, the number of attempts is incremented, but the number of installations is not.

To perform this function, an attempt counter is maintained by the bootloader 100. This attempt counter is incremented before the bootloader 100 has decrypted the encrypted payload 320, as shown in Box 440 of FIG. 4. If the software image is successfully installed, the bootloader 100 resets this attempts counter, as shown in Box 460. However, if the malicious actor powers off the device before the software image has been successfully loaded into the memory device 25, the attempts counter is not reset. Thus, if a malicious actor attempts to perform a side channel attack by repeatedly resetting the device before it actually performs the installation, the attempts counter will reach its maximum threshold and an error condition will be flagged.

In another embodiment, the table like that shown in FIG. 6 may be used to track the number of attempts of each version. The number included in the table may be the number of consecutive attempts to install a particular version or the cumulative number of attempts to install that version. If the number of attempts exceeds a threshold, the bootloader 100 may detect an error condition.

Thus, the attempts limit is used to monitor either the number of times that a new bundle has been installed or attempted to be installed.

Through the use of both a version check and an attempts limit, the likelihood that a malicious actor is able to successful mount a side channel attack is significantly diminished.

As shown in Box 470, the bootloader 100 may detect an error condition. The bootloader 100 may take a number of actions when an error condition is detected. In one embodiment, the bootloader 100 will refuse to install any new bundles once an error condition is detected. In another embodiment, the bootloader 100 may delete the symmetric key so that it is unable to decrypt any bundles and the symmetric key cannot be captured by the malicious actor. Further, the device 10 may no longer be functional at this time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of securely loading a new software image onto a device, comprising:

receiving, at the device, a bundle, the bundle containing a header and an encrypted payload, from a sender;

verifying the integrity of the header and the identity of the sender, wherein the header includes a version number;

performing a version check;

comparing a value of an attempts counter to install a new software image to a predetermined threshold, wherein the attempts counter tracks a number of times that an installation of a software image has been attempted;

decrypting the encrypted payload, wherein the new software image is contained in the encrypted payload, only if:

the version check is successful and the attempts counter is less than the predetermined threshold; and after the decrypting, installing the new software image in a memory device in the device;

wherein the attempts counter is incremented prior to the decrypting.

2. The method of claim 1, wherein the version check comprises determining that the version number in the header is greater than a version of the software image currently installed in the device.

3. The method of claim 1, further comprising:

receiving an update graph from the sender, wherein the update graph specifies allowed versions as a function of a version of the software image currently installed in the device, wherein the version check determines whether the version in the header is an allowed version based on the update graph.

4. The method of claim 1, wherein the version check comprises:

determining a number of times that a software image having the version number in the header has previously been installed in the device; and determining whether the number of times is less than a predetermined threshold.

5. The method of claim 1, wherein the attempts counter is reset after the software image has been successfully installed in the memory device.

6. The method of claim 1, further comprising:

detecting that an error condition has occurred if the attempts counter is not less than the predetermined threshold.

7. The method of claim 6, wherein the device will not decrypt any encrypted payloads once the error condition is detected.

8. The method of claim 1, wherein the bundle is signed by the sender, and further comprising:

verifying the integrity of the bundle and the identity of the sender prior to the decrypting.

9. The method of claim 8, wherein the header is signed by the sender using a header signature and the encrypted payload is also signed by the sender using a payload signature, further comprising:

verifying the integrity of the header and the identity of the sender prior to the decrypting; and verifying the integrity of the software image and the identity of the sender prior to the decrypting.

10. A non-transitory storage medium, comprising a software program wherein the software program comprises instructions, which when executed by a processing unit of a device, enable the device to:

receive a bundle, the bundle containing a header and an encrypted payload, from a sender;

verify the integrity of the header and the identity of the sender, wherein the header includes a version number;

perform a version check;

compare a value of an attempts counter to install a new software image to a predetermined threshold, wherein the attempts counter tracks a number of times that an installation of a software image has been attempted;

decrypt the encrypted payload, wherein the new software image is contained in the encrypted payload, only if:

the version check is successful and the attempts counter is less than the predetermined threshold; and after the decrypting, install the new software image in a memory device in the device;

wherein the attempts counter is incremented prior to the decrypting.

11. The non-transitory storage medium of claim 10, wherein the version check comprises determining that the version number in the header is greater than a version of the software image currently installed in the device.

12. The non-transitory storage medium of claim 10, wherein the software program further comprises instructions, which when executed by the processing unit, enable the device to:

receive an update graph from the sender, wherein the update graph specifies allowed versions as a function of a version of the software image currently installed in the device, wherein the version check determines whether the version in the header is an allowed version based on the update graph.

13. The non-transitory storage medium of claim 10, wherein the attempts counter is reset after the software image has been successfully installed in the memory device.

14. The non-transitory storage medium of claim 10, wherein the software program further comprises instructions, which when executed by the processing unit, enable the device to:

detect that an error condition has occurred if the attempts counter is not less than the predetermined threshold.

15. The non-transitory storage medium of claim 14, wherein the device will not decrypt any encrypted payloads once the error condition is detected.

16. The non-transitory storage medium of claim 10, wherein the bundle is signed by the sender, and wherein the software program further comprises instructions, which when executed by the processing unit, enable the device to:

verify the integrity of the bundle and the identity of the sender prior to the decrypting.

17. The non-transitory storage medium of claim 16, wherein the header is signed by the sender using a header signature and the encrypted payload is also signed by the sender using a payload signature, wherein the software program further comprises instructions, which when executed by the processing unit, enable the device to:

verify the integrity of the header and the identity of the sender prior to the decrypting; and verify the integrity of the software image and the identity of the sender prior to the decrypting.

\* \* \* \* \*